(12) United States Patent
Eakin (10) Patent No.: US 10,182,553 B2
(45) Date of Patent: Jan. 22, 2019

(54) ROTARY LIVESTOCK FEEDER WITH GRAVITY FLOW FEED OPENINGS

(71) Applicant: Osborne Industries, Inc., Osborne, KS (US)

(72) Inventor: George R. Eakin, Osborne, KS (US)

(73) Assignee: Osborne Industries, Inc., Osborne, KS (US)

( * ) Notice: Subject to any disclaimer, the term of this patent is extended or adjusted under 35 U.S.C. 154(b) by 624 days.

(21) Appl. No.: 14/738,534

(22) Filed: Jun. 12, 2015

(65) Prior Publication Data

US 2015/0359191 A1 Dec. 17, 2015

Related U.S. Application Data

(60) Provisional application No. 62/012,036, filed on Jun. 13, 2014.

(51) Int. Cl.
*A01K 5/02* (2006.01)

(52) U.S. Cl.
CPC .................................. *A01K 5/0225* (2013.01)

(58) Field of Classification Search
CPC .......... A01K 5/00; A01K 5/01; A01K 5/0114; A01K 5/0142; A01K 5/02; A01K 5/0225
See application file for complete search history.

(56) References Cited

U.S. PATENT DOCUMENTS 3,450,431 A * 6/1969 Tyler ..................... A01C 15/006
　　　　　　　　　　　　　　　　　　　　217/60 R
3,855,971 A * 12/1974 Hess ..................... A01K 5/0225
　　　　　　　　　　　　　　　　　　　　119/449

(Continued)

FOREIGN PATENT DOCUMENTS

CA　　2452148 A1 * 6/2005 ........... A01K 5/0225
EP　　1188371 A2 * 3/2002 ........... A01K 5/0225

(Continued)

OTHER PUBLICATIONS

PCT International Search Report dated Oct. 1, 2015 for PCT/US2015/035689.

(Continued)

*Primary Examiner* — Monica L Williams
*Assistant Examiner* — Aaron M Rodziwicz
(74) *Attorney, Agent, or Firm* — Jeffrey L. Thompson; Thompson & Thompson, P.A.

(57) ABSTRACT

A feeder for dispensing feed to livestock includes a trough and a hopper mounted above the trough. The hopper includes a sidewall, a bottom, a central feed discharge hole through the bottom, and a plurality of gravity flow feed openings arranged around the central feed discharge hole. A deflector is mounted in the hopper above and vertically spaced from the hopper bottom to cover the central feed discharge hole to restrict gravity flow of feed from the hopper through the central feed discharge hole. A sweep member is mounted for rotation about a vertical axis for sweeping feed under the deflector to the central feed discharge hole for discharge into the trough. A closure system is associated with the gravity flow feed openings to automatically close the gravity flow feed openings once animals start moving the sweep member to sweep feed to the central feed discharge hole.

6 Claims, 11 Drawing Sheets

(56) References Cited

U.S. PATENT DOCUMENTS

| | | | | |
|---|---|---|---|---|
| 3,949,909 A * | 4/1976 | Sterner | A01K 5/008 119/57.91 |
| 4,353,329 A * | 10/1982 | Thibault | A01K 5/0241 119/52.1 |
| 4,462,338 A * | 7/1984 | Thibault | A01K 5/0241 119/53 |
| 4,729,344 A * | 3/1988 | Winkel | A01K 5/0241 119/53.5 |
| 4,889,078 A * | 12/1989 | Smiley | A01K 5/0216 119/51.5 |
| 5,044,318 A * | 9/1991 | Sutton | A01K 5/0241 119/53 |
| 5,069,164 A | 12/1991 | Wiwi | |
| 5,170,749 A * | 12/1992 | Collie, III | A01K 5/00 119/51.01 |
| 5,275,130 A * | 1/1994 | Muckler | A01K 5/0233 119/53.5 |
| 5,435,267 A * | 7/1995 | Patterson | A01K 5/0241 119/52.4 |
| 6,199,511 B1 | 3/2001 | Thibault | |
| 6,427,628 B1 * | 8/2002 | Reece | A01K 5/0291 119/51.11 |
| 9,313,999 B2 * | 4/2016 | Jansen | A01K 5/0225 |
| 2002/0124805 A1 * | 9/2002 | Bondarenko | A01K 5/0225 119/52.1 |
| 2005/0076843 A1 * | 4/2005 | Ansaldo | A01K 5/0225 119/57.91 |
| 2006/0000417 A1 * | 1/2006 | Loewe | A01K 5/0225 119/53 |
| 2007/0163505 A1 * | 7/2007 | Lynch | A01K 5/0225 119/52.1 |
| 2011/0297093 A1 * | 12/2011 | Lai | A01K 5/0114 119/54 |

FOREIGN PATENT DOCUMENTS

| | | | |
|---|---|---|---|
| SU | 623783 A1 * | 9/1978 | |
| SU | 860736 A1 | 9/1981 | |

OTHER PUBLICATIONS

PCT Written Opinion of the International Searching Authority dated Oct. 1, 2015 for PCT/US2015/035689.

Supplemental European Search Report, Application No. EP 15 80 7460, date of EP Communication dated Nov. 8, 2017.

* cited by examiner

ROTARY LIVESTOCK FEEDER WITH GRAVITY FLOW FEED OPENINGS

RELATED APPLICATIONS

This application claims priority of U.S. Provisional Application No. 62/012,036 filed on Jun. 13, 2014. The content of this prior application is incorporated herein by reference.

BACKGROUND OF THE INVENTION

Field of the Invention

The present invention relates generally to livestock feeders. In particular, the present invention relates to a livestock feeder that can be used as a gravity flow feeder for small animals, and as a mechanical rotary feeder for larger animals.

Description of the Related Art

The method of raising pigs has changed significantly over the past 40 years. Prior to the large pork production units of today, pigs were raised on the many small family farms that populated the United States of America. These small pig raising farms were diversified with many types of animals which allowed the farms to raise their own grain and grind some of that grain into feed for the farm animals. The animals included on most farms were chickens, cows, beef animals, and pigs. This diversification ensured that everything on the farm had a use and most waste materials were consumed by one type of animal on the farm. The farm animals typically lived in small outdoor sheds and occasionally in pens with other types of farm animals.

Over the years, these diversified farms began to change into specialized farms. Many began to cut down on the number of different animals raised in lieu of larger numbers of the same type of animals. Some farms selected cattle, some selected chickens, and still others chose swine. Most of the changes depended on the producer's interests, resources, and animal facilities. In the 1970's the trend in the pork industry was to increase the number of breeding female pigs on the farm and place the birthing pigs (farrowing) into buildings where the animal care could be more centrally provided. The baby pigs were then moved outside to grow until they were taken to market. More changes in the pork industry continued the following years. Eventually pigs were moved into buildings designed and ventilated for their specific age.

There are four types of buildings commonly used in the production of pork. The first type of building is the Breeding/Gestation building where the female pigs are bred and allowed to grow during the gestation period. The gestation period of a pig is typically three months, three weeks, and three days.

When the gestation cycle is completed, the female pigs are moved to the second building type. This building is used for birthing, or more commonly known as farrowing, of the females. This second building type is known as the Farrowing building. The female pigs (gilts/sows) are placed into a stall that prevents movements during farrowing and protects the baby pigs from being crushed to death as a result of the mother laying on them. The time between farrowing and weaning the baby pig is typically 21-28 days depending on the producer. The baby pigs will begin eating small amounts of dry solid feed during this lactation period. The feed is usually placed on a flat tray or a small self feeder.

The baby pigs are weaned from the mother at approximately 21-28 days of age. The mother (sow) is returned to the Breeding/Gestation building while the baby pigs are moved to the third type of building known as the Nursery. The nursery pig will typically be approximately 4.5-7.0 kg in weight at weaning and will be placed into larger pens with several other baby pigs from different mothers. These nursery pigs are fed solid feed through the use of small feeders that are filled with a specialized type of feed that matches their digestive development. There are usually three different formulations of feed provided to the nursery pigs as they grow to about 16-22 kg.

When the nursery pigs reach the desired weight, they are moved to the fourth type of building known as the Finishing building. The nursery pigs will remain in finishing pens from their entry weight of 16-22 kg to the market weight which is approximately 127 kg. The length of time for a nursery pig to reach market weight depends on many factors. Some of these factors include the quality of feed, the proper phase in which different feeds are introduced, building ventilation, water supply, disease, equipment, and animal handling techniques. Each of these factors has growth consequences when problems arise and the result is usually seen in the days it takes for a nursery pig to reach market weight.

Animal handling techniques and animal movements from one building to another create stress in nursery pigs that result in slower growth. The animal stress can also cause sickness, lack of appetite, and general disorientation which compounds the delay in animal growth and development. Special care must be taken when handling animals to prevent these effects from occurring.

Pork production in the 1990's saw further changes in the way swine were raised. Farms grew even larger and became known as farrow-to-finish farms. However, since the farms were becoming much larger with increasing animal population on each farm, major concerns about diseases arose. The concern was that since there was a large population of swine in a concentrated area, if a disease outbreak occurred, it could quickly doom the entire swine population. The solution to the disease concern was to begin separating the animal population and place them in different geographical locations that provided a single type of growth management. Therefore, the farms were separated into Breeding/Gestation/Farrowing farms (Sow Farms), Nursery farms, and Finishing farms all located at different geographical sites. This became known as three-site production.

The three-site production arrangement created a different problem. Baby pigs must be transported from the Sow Farm to a Nursery site and when the appropriate animal weight is reached the nursery pigs are moved to the Finishing site. Sometimes these sites are many kilometers apart and the transportation time and conditions (weather, trailer design, temperature, etc.) create much animal stress. The result of the animal stress is poor growth for a certain period of time until the pigs settle down and become acclimated to their new surroundings.

Three-site production continued to be used until the early 2000's when the Nursery and Finishing sites were combined to form what is known as Wean-to-Finish farms. The change to Wean-to-Finish farms reduced the number of production sites from three to two and reduces the animal stress as a result of the animal handling and movement. This Wean-to-Finish process allowed producers to place their Breeding/Gestation/Farrowing site, known as a Sow Farm, in mild climates while placing the Wean-to-Finish farms in geographically located sites that are close to the production of feed grains. These geographical areas in the United States are typically in Iowa, Illinois, and Indiana where corn production is greatest. The reason for locating Wean-to- Finish farms in corn producing areas is to reduce the amount of transportation costs associated with moving feed.

Feed consumption of swine is very significant, especially as the pig approaches market weight. The feed costs are approximately 70% of the cost to produce pork. Any reduction in feed costs directly impacts the profitability of a pork producer. Likewise, the faster the weaned pigs grow to market weight, the better the growth efficiency is of the operation. Therefore, both feed costs and animal growth are the most important factors in a profitable pork operation.

The amount of feed that a growing pig requires is significantly increased as the animal approaches market weight. However, the feed efficiency of a pig decreases as it grows resulting in increased feed consumption with less animal weight gain. The larger the pig grows, the more it eats, but less of the feed consumed is turned into marketable meat weight.

Another aspect of a growing pig is that the pig becomes more and more interested in rooting, or playing, with anything that moves. This is a natural instinct for swine. They forage for food at ground level and will use their massive strength to move obstacles that are in the way. When eating, pigs usually sort the main feed component from the dirt and chaff by blowing and rooting. Therefore, if there is a large pile of feed available, a pig will scatter the feed and trample most of it in an effort to locate the best feed materials.

The design of feeders used in providing feed for growing pigs is very important when considering the factors presented earlier. The traditional pig feeder is designed where bulk feed is stored in a hopper above some outlet openings located in the feed trough. As the feed is removed from around the opening, additional feed flows from the hopper to fill the space where the feed has been removed. Gravity is the mechanism that causes this feed to flow from the hopper to the feed trough. This traditional pig feeder has become known as a gravity flow feeder. Therefore, the gravity flow design allows feed to always be present when the pig enters the feed trough area. The amount of feed flowing from the feed hopper to the feed trough is regulated by adjusting a slide gate that covers the opening in the feed trough. When the pigs are small, the opening will be large, allowing more feed to be presented to the pigs. As the pigs grow, the adjustment gate is closed to restrict the feed flow from becoming too great and allowing the pig to sort and waste the feed. Timing of this feed adjustment is crucial and often difficult to maintain.

Figure 8:
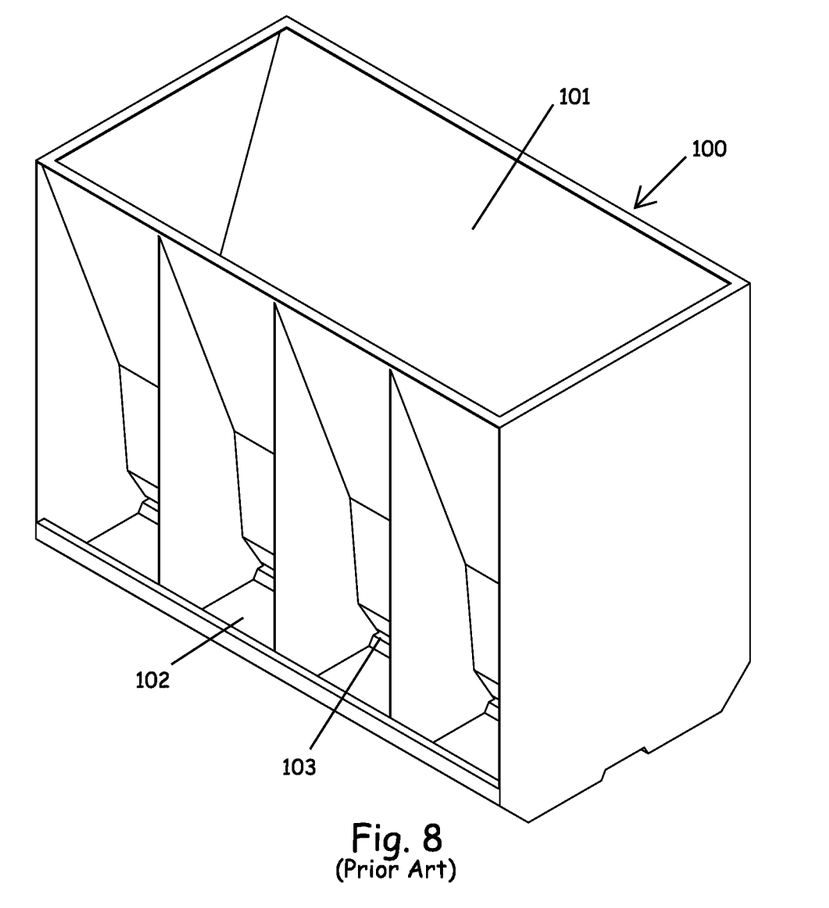
FIG. 8 illustrates a conventional gravity flow feeder.
Figure 9:
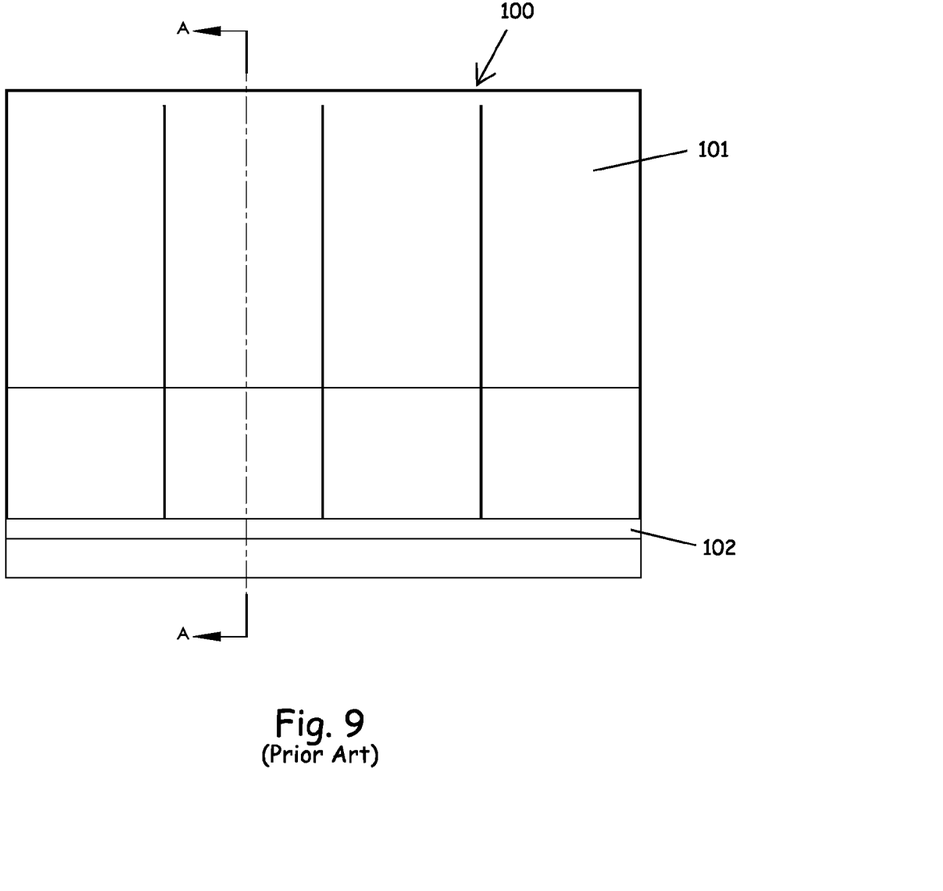
FIG. 9 is an elevation view of the gravity flow feeder shown in FIG. 8.
Figure 10:
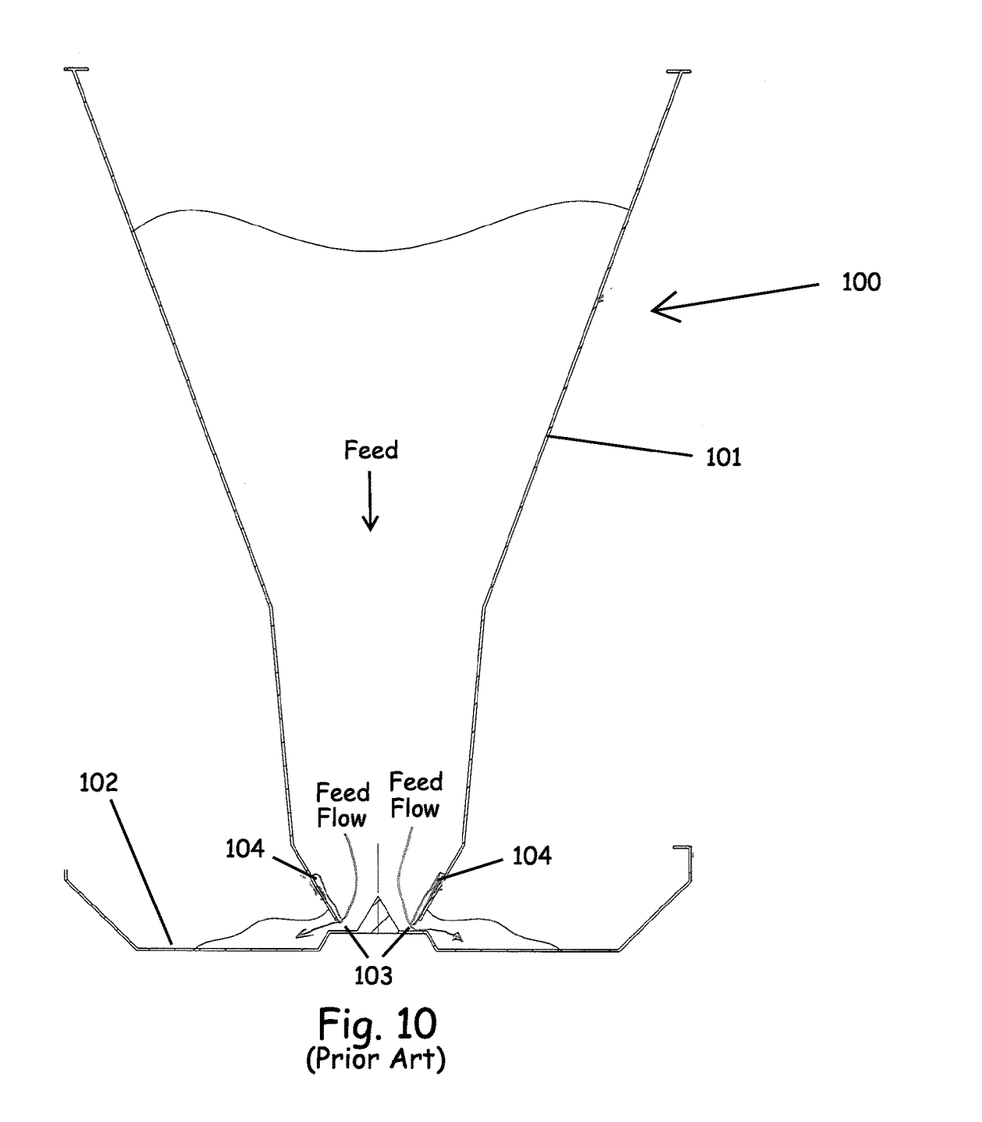
FIG. 10 is a cross section view taken along line A-A in FIG. 9 to show the feed flow through the feeder.

FIGS. 8 to 10 show a typical gravity flow feeder 100. This type of feeder 100 has a feed hopper 101 that is connected directly to the feed trough 102 through an opening 103 at the base of the feed hopper 101. The feed flow through the gravity flow feeder 100 is shown in the cross section view of FIG. 10. The feed is stored in the feed hopper 101 and flows out of the bottom into the feed trough 102. The feed flows through feed adjustment doors 104 that restrict feed flow into the feed trough 102. The gravity flow system works very well when animals are small and do not consume much feed, but as the animals grow, the feed adjustment doors 104 must be closed to prevent excess feed from flowing from the feed hopper 101 into the feed trough 102. Any excess feed will be wasted by larger animals as a result of the animal's natural rooting and sorting behavior. Therefore, when the feed adjustment doors 104 are closed and restrict feed flow, the animal's become hungrier, more aggressive, and do not grow as intended. The typical gravity flow feeder works very well for small animals, but has serious performance deficiencies as the animals grow larger and stronger.

Osborne Industries, Inc. recognized the importance of hog feeder design and developed a mechanical rotary feeder known in the industry as the Big Wheel® Feeder (U.S. Pat. No. 6,199,511) to overcome the two primary factors outlined earlier. The Big Wheel® Feeder operated on a mechanical flow principal where the pig's natural rooting instinct is utilized to operate the feeder. Since the feeder is round in design and has a rotary feed wheel that transports the feed from the feed hopper to the feed trough, it constantly mixes all the feed in the trough, so that sorting and feed wasting is minimized. The Big Wheel® Feeder only requires a one-time adjustment to accommodate the type of feed quality and coarseness of feed grind, so that the feed flows properly through the feeder's mechanical delivery system.

Mechanical rotary feeders have been manufactured in several different sizes to fit the size of pig being raised. Nursery feeders and finishing feeders were designed to meet the needs of the respective pig size and weight. This rotary feed delivery became the feeder of choice for pork producers in the 1990's, owing to its substantial reduction of feed waste and improved feed efficiency. The use of gravity flow type feeders decreased as feed costs increased and producers strived to reduce the number of days it takes to raise a baby pig to a market sized pig.

The current swine production process (sow farms and wean-to-finish farms), which has been described earlier, has caused several problems for the design, operation, and upkeep of pig feeders. The three-site production process benefited greatly from the mechanical rotary feeder design invention. However, as the production process has been changed to Sow Farms and Wean-to-Finish farms, problems with pig feeders has been placed back into focus.

The primary problem is designing a pig feeder that is a one-size-fits-all solution. The pig feeder design must feed growing pigs from wean size (4.5-7.0 kg) to finish size (127-130 kg) while meeting durability, ease of use, reduction of feed waste, and optimal feed delivery requirements. The two types of pig feeders each have their strengths and weaknesses in meeting these requirements.

The gravity flow feeder design is optimal in the starting of weaned pigs because the feed is always present in the feed trough and there is no action or movement required by the baby pig. However, as the baby pig grows, the gravity flow feeder design is quickly overwhelmed with the behavior of a growing pig and adjusting the feed flow becomes a significant challenge. The feed flow adjustment is critical to provide enough feed to enhance growth, but not so much that waste occurs. There is a very fine line in making this adjustment and normally the adjustments are not appropriately made, resulting in either under-nourished pigs or excessive feed waste. The amount of feed wasted by growing animals is very costly and creates waste management challenges. Many Wean-to-Finish farms have hired personnel to travel from farm to farm to make these timely adjustments, however, disease concerns and lack of skilled personnel are preventing best practice procedures from being fully executed.

Mechanical rotary feeders are optimal on the larger growing side of the finishing pig owing to the pig's natural behavior, superior feed flow control (auto regulating), and consistent feed mixing to reduce sorting and fouling of feed.

The major disadvantage of the mechanical rotary feeder design is that the feeder design requires the pig to be of sufficient weight and size to move or operate the feed wheel which mechanically moves feed from the feed hopper to the feed trough. If the feed wheel is not moved, no feed will be delivered to the feed trough and the result will be under-nourished pigs. This is why the mechanical rotary feeder design was constructed to match the animal size and weight. It is possible to use a small mechanical Rotary feeder designed for baby pigs weighing approximately 7 kg and feed the larger growing pigs weighing 50-100 kg. However, the feed trough size will eventually be too small to accommodate the head size of the growing pig (100 kg and above), and the feed hopper capacity will be less than required to feed the number of pigs that may be eating.

If a mechanical rotary feeder designed for finishing pigs (minimum pig starting weight 20 kg) is used to start the weaned pig at a weight of 7.0 kg, the weaned pig will have insufficient strength to move the feed wheel and dispense feed into the feed trough. Since the smaller weaned pigs are unable to operate the larger mechanical rotary feeder, they will be under-nourished to the point of death, if no other attention is provided.

There is a need in the industry for an improved livestock feeder that can be used in a wean-to-finish swine operation.

SUMMARY OF THE INVENTION

The present invention corrects the above condition and allows the larger mechanical rotary feeder design to be modified into a gravity flow type feeder at the beginning of use and automatically adjusts to a mechanical rotary feeder to meet the needs of the larger finishing pig. The present invention provides direct openings at the bottom of the feed hopper which have slide gates to close off the opening. The closure of the slide gate is the result of the feed wheel movement which is required for the mechanical rotary feeder design to work properly.

The present invention is designed such that when weaned pigs, weighing approximately 7.0 kg, are placed into a pen with the larger mechanical rotary feeder, the openings will allow feed to gravity flow out of the feed hopper and directly into the feed trough. The openings will be sized so that enough feed is allowed to gravity flow into the feed trough to nourish the weaned pigs, but not enough to allow for wasting or fouling. As the weaned pigs grow, the supply of feed from the openings will be overcome and the pigs will begin rooting the feed wheel to gain access to the feed that is around the feed wheel. When the feed wheel moves, a pin located near the feed wheel center contacts the slide gates and causes them to close off the openings. The movement of the feed wheel will then cause feed to flow from the feed hopper to the feed trough resulting in a fully mechanical flow feeder.

When the pigs reach market size and are removed from the feed pen, the feed pens are cleaned, and the feeders are emptied and prepared for another pen of weaned pigs. The slide gates over the openings located at the bottom of the feeder hopper will be pushed back open by the cleaning personnel and the feeder is set for another round of growing pigs.

According to one aspect of the present invention, a feeder for dispensing feed to livestock is provided, comprising: a trough; a hopper mounted above the trough, the hopper including a sidewall, a bottom, a central feed discharge hole through the bottom, and at least one gravity flow feed opening through the bottom, the gravity flow feed opening being located between the central feed discharge hole and the sidewall; a deflector mounted in the hopper above the hopper bottom and vertically spaced from the hopper bottom, the deflector covering the central feed discharge hole to restrict gravity flow of feed from the hopper through the central feed discharge hole; a sweep member mounted for rotation about a vertical axis, the sweep member being located between the deflector and the hopper bottom for sweeping feed to the central feed discharge hole to discharge therethrough into the trough; and a closure system associated with the gravity flow feed opening, the closure system having a first condition in which the gravity flow feed opening is open to allow gravity feed flow through the opening into the trough, and a second condition in which the gravity flow feed opening is closed.

According to another aspect of the present invention, a feeder for dispensing feed to livestock is provided, comprising: a trough; a hopper mounted above the trough; a gravity flow feed system having at least one gravity flow feed opening for allowing feed to flow by gravity from the hopper into the trough; a mechanical rotary feed flow system having a feed discharge hole and an animal-activated sweep member for sweeping feed from the hopper into the feed discharge hole for discharge into the trough; and a closure system associated with the gravity flow feed system, the closure system having a first condition in which the gravity flow feed opening is open to allow gravity feed flow through the opening, and a second condition in which the gravity flow feed opening is closed, and an activator mechanism arranged to move with the sweep member to cause the closure system to change from its first condition into its second condition.

According to another aspect of the present invention, a feeder for dispensing feed to livestock is provided, comprising: a trough; a hopper mounted above the trough; a gravity flow feed system having at least one gravity flow feed opening for allowing feed to flow by gravity from the hopper into the trough; a mechanical rotary feed flow system having a feed discharge hole and an animal-activated sweep member for sweeping feed from the hopper into the feed discharge hole for discharge into the trough; and a closure system associated with the gravity flow feed system, the closure system having a first condition in which the gravity flow feed opening is open to allow gravity feed flow through the opening, and a second condition in which the gravity flow feed opening is closed, and an activator mechanism arranged to move with the sweep member to cause the closure system to change from its first condition into its second condition.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A rotary livestock feeder 10 for dispensing feed to livestock according to the present invention will now be described in detail with reference to FIGS. 1 to 7 of the drawings.

Figure 1:
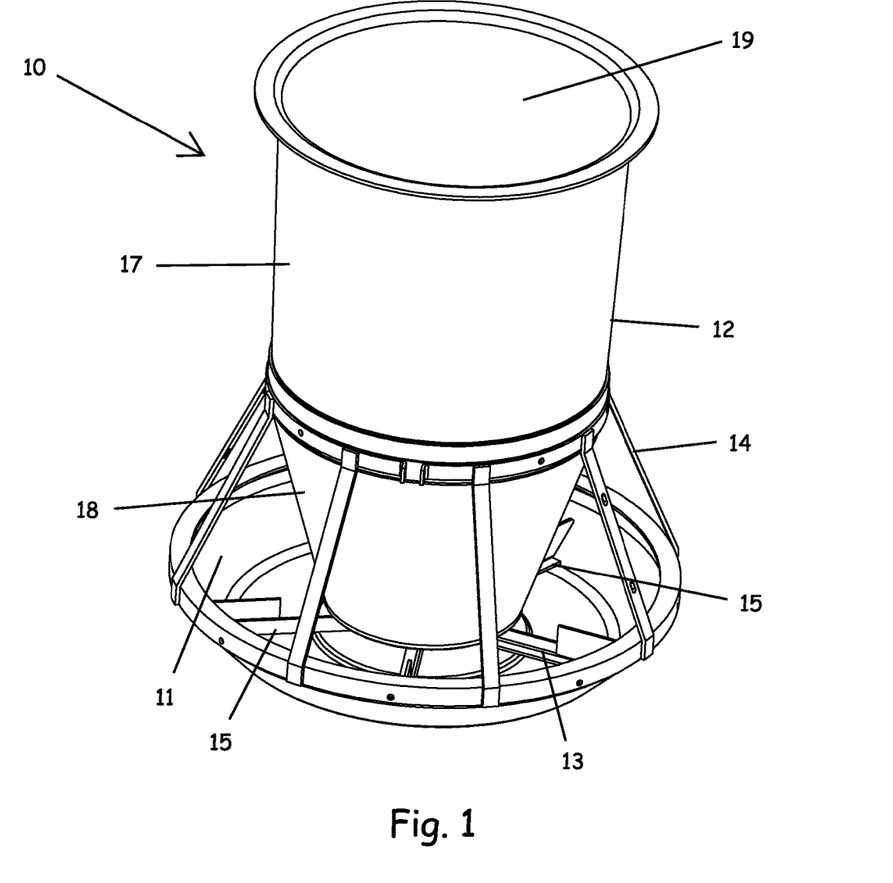
FIG. 1 is a perspective view of a rotary livestock feeder according to the present invention.

Conventional parts of the rotary livestock feeder 10 are illustrated in FIG. 1. The feeder 10 includes a trough 11, a hopper 12 mounted above the trough 11, a feed wheel 13 disposed below the hopper 12 in the trough 11, and a cage 14 connecting the hopper 12 to the trough 11. The feed wheel 13 has a plurality of spokes 15 extending radially outwardly from a hub 16, and the hub 16 rotates around a central vertical axis when animals push against the spokes 15. This type of rotary feeder (without the gravity flow feature of the present invention described below) was developed in the 1980s as means to control the feed flow from the feed hopper 12 into the trough 11. The rotary design with the feed wheel 13 in the trough 11 allowed the feeder 10 to use the natural rooting and sorting behavior of swine to operate and clean the feed trough 11.

Figure 2:
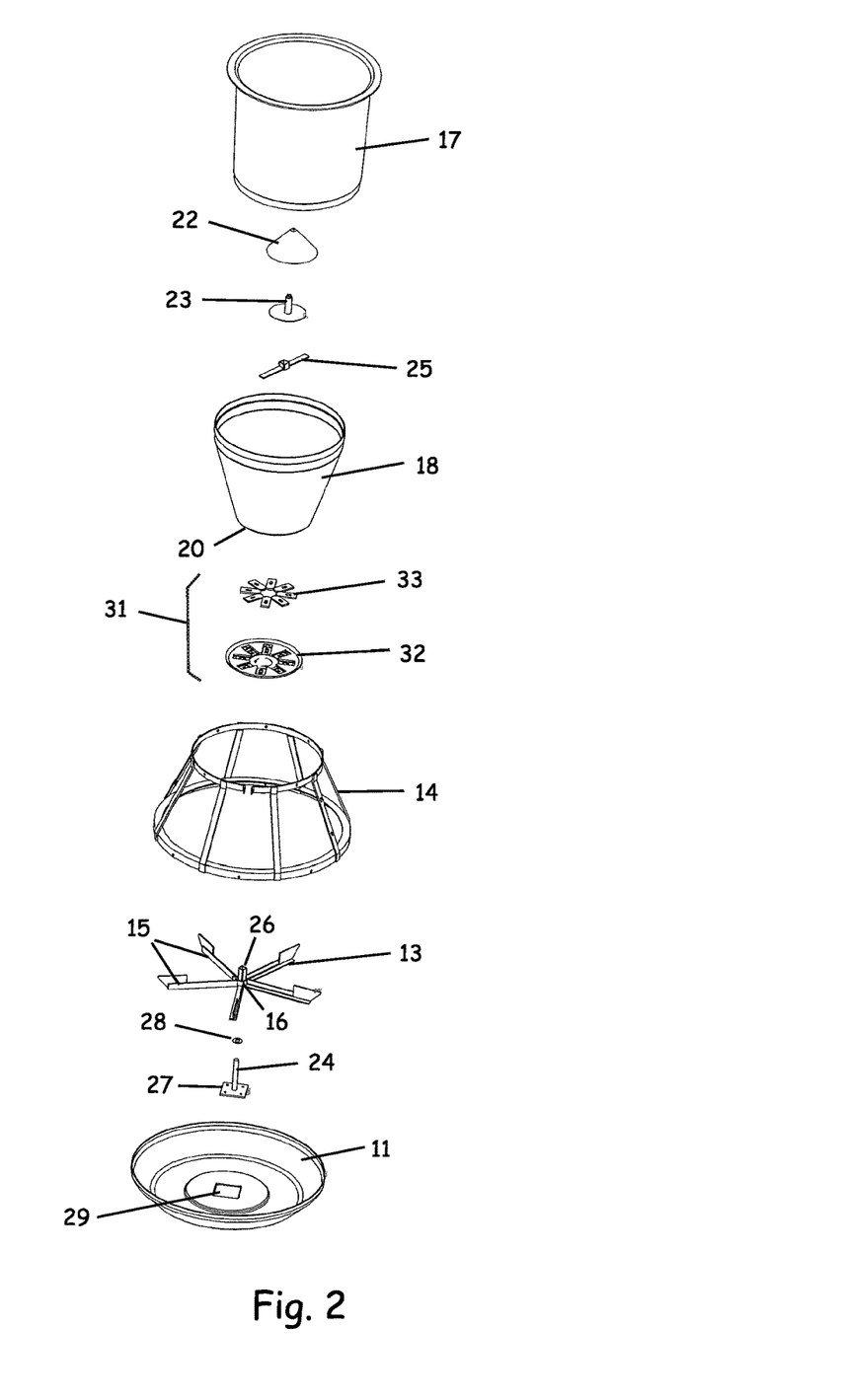
FIG. 2 is an exploded perspective view of the rotary livestock feeder shown in FIG. 1.

FIG. 2 shows the components that are assembled together to comprise the rotary feeder 10 of the present invention. The hopper 12 includes a top portion 17 attached to a bottom portion 18. The top portion 17 of the hopper 12 has a generally cylindrical sidewall, and the bottom portion 18 of the hopper has a frustoconical sidewall that tapers downwardly and inwardly. The hopper 12 provides an area 19 where the feed is placed in storage prior to being dispensed by gravity flow or mechanical movement into the trough 11.

The bottom 20 of the hopper 12 has a central feed discharge hole 21 where the feed exits from the feed hopper 12 into the trough 11. Inside of the bottom portion 18 of the hopper 12 are a feed cone 22 and feed cone support 23 that is suspended above the central feed discharge hole 21 located in the hopper bottom 20. The feed cone support 23 is concentric with a central axle 24 to ensure central alignment above the central feed discharge hole 21. The feed cone 22 functions as a deflector vertically spaced above the bottom 20 of the hopper 12 that covers the central feed discharge hole 21 and restricts or prevents feed from flowing to the central feed discharge hole 21 due solely to gravity.

Beneath the feed cone 22 is a feed sweep member 25. The feed sweep member 25 is operably coupled with the center tube 26 of the feed wheel 13 for rotation together with the feed wheel 13. The feed wheel 13 is located concentric to the axle 24 and rests on the plate 27 connected to the axle. A feed wheel washer 28 is inserted between the feed wheel 13 and the axle plate 27. The feed wheel washer 28 provides the clearance necessary to prevent the feed wheel 13 from dragging on the trough 11. The axle 24 is attached to the center square location 29 of the trough 11. The feed hopper bottom 20 is connected to the trough 11 through the use of the trough cage 14. The trough cage 14 provides circumferentially arranged areas where the animals can access the feed in the trough 11.

The mechanical operation of the rotary feeder 10 is achieved by the animal's natural instinct of rooting and sorting of feed stuff. The animal enters the feeding area created by the trough cage 14 and eats the feed located in the trough 11. As the feed is consumed, the animal roots the feed wheel 13 one way or another causing rotation of the feed wheel 13. The animal-induced rotation of the feed wheel 13 in the trough 11 causes the feed sweep member 25 to rotate and sweep feed from inside of the bottom portion 18 of the hopper 12 to fall through the central feed discharge hole 21 located in the feed hopper bottom 20. The feed falls into the center of the trough 11 and is swept to the outer perimeter of the trough 11 by the feed wheel 13. Fresh feed is available for the process to begin over again.

Figure 3A:
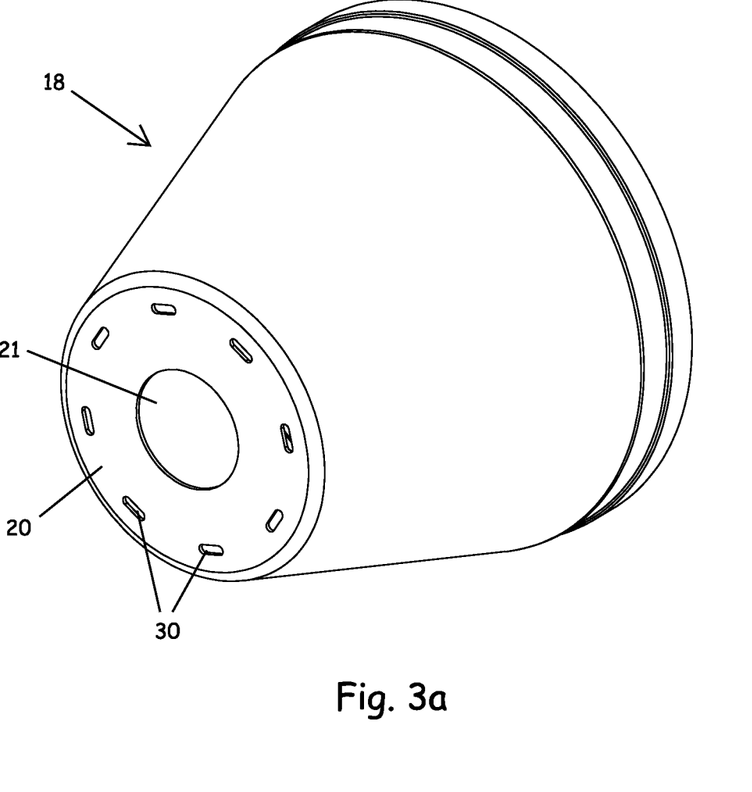
FIG. 3a is a perspective bottom view of a feed hopper of the rotary livestock feeder.

The present invention differs from a conventional rotary feeder by having at least one gravity flow feed opening 30 through the bottom 20 of the hopper 12 in addition to the central feed discharge hole 21. The gravity flow feed openings 30 are used to allow feed to flow directly into the trough 11 by gravity. For example, as shown in FIG. 3a, a plurality of spaced-apart gravity flow feed openings 30 can be arranged in a circular pattern in the bottom 20 of the hopper 12 around the central feed discharge hole 21. The gravity flow feed openings 30 are arranged near the outer perimeter of the hopper bottom 20 between the central feed discharge hole 21 and the sidewall of the hopper 12. The gravity flow feed openings 30 are positioned so that the deflector cone 22 or other structures within the feed hopper 12 do not obstruct or restrict the gravity flow of feed through the openings 30. The feed stored inside of the feed hopper 12 flows freely into the trough 11 through the gravity flow feed openings 30.

Figure 3B:
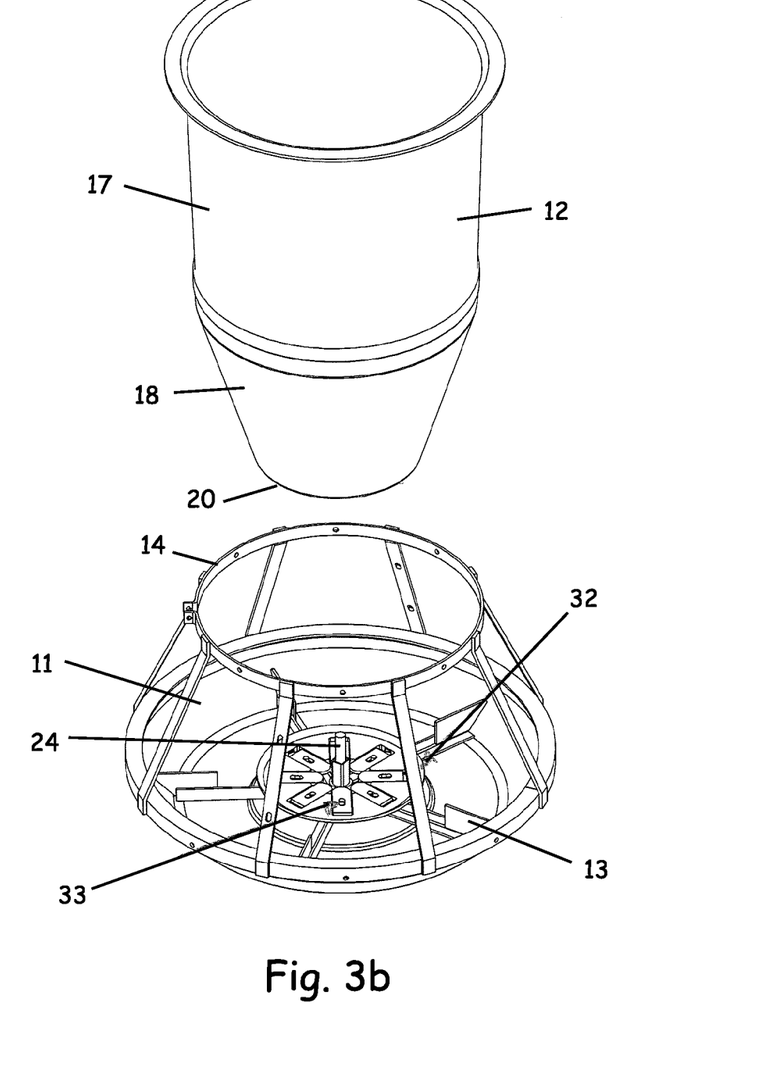
FIG. 3b is a partially exploded perspective view of the rotary livestock feeder, showing the feed hopper separated from the trough cage.

A closure system 31 is associated with the gravity flow feed openings 30 to allow the openings 30 to be closed when gravity feed flow is not desired (e.g., when the animals become large enough to operate the feed wheel). As shown in FIG. 2, the closure system 31 includes a gravity flow modification plate 32 attached on the underneath side of the feed hopper bottom 18. Inside of the gravity flow modification plate 32 are a plurality of slide doors 33 that are movable along respective radial lines extending from the central vertical axis of the feeder 10. The slide doors 33 can be moved radially outwardly from a first position in which the gravity flow feed openings 30 are open, to a second position in which the gravity flow feed openings 30 are closed to block gravity flow of feed from the feed hopper 12 into the trough 11. FIG. 3b shows the gravity flow modification plate 32 and slide doors 33 assembled and concentrically located around the axle 24.

Figure 4:
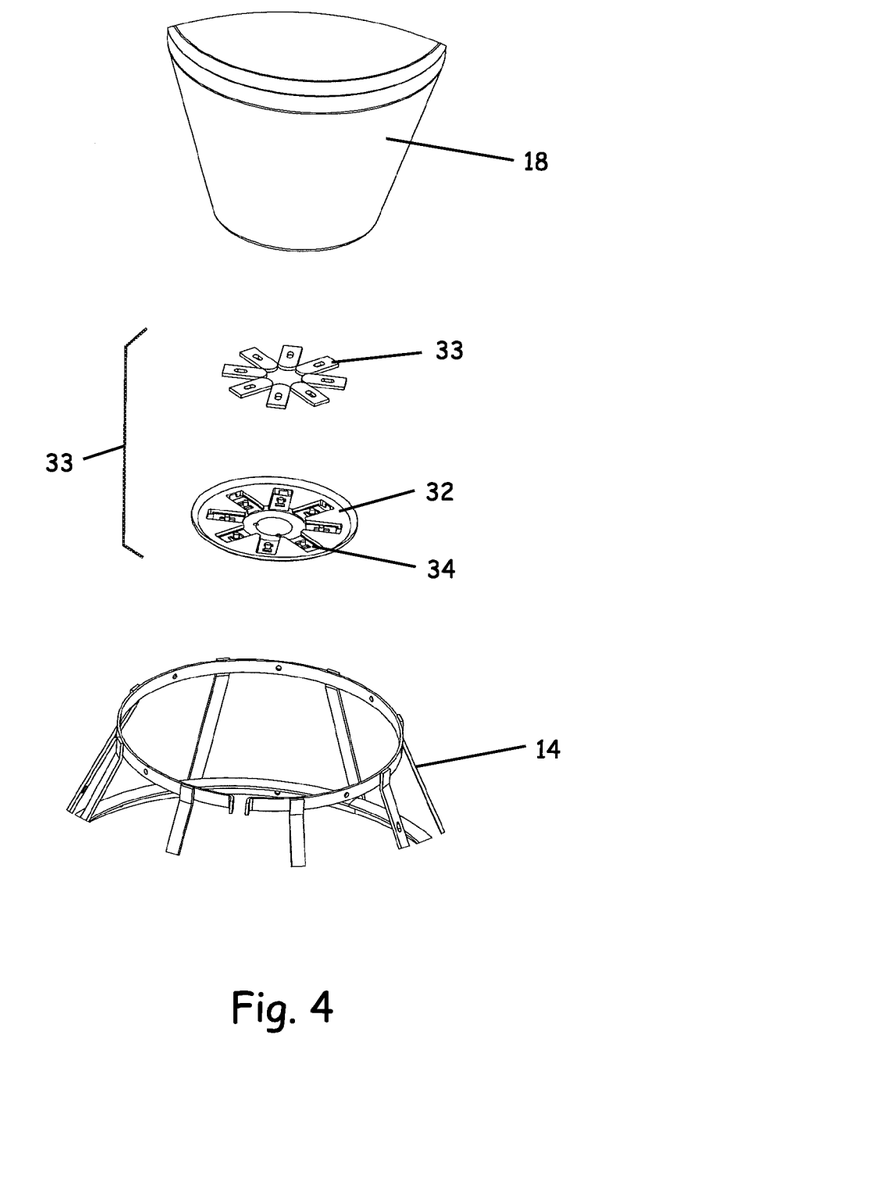
FIG. 4 is an exploded perspective view of the lower portion of the hopper, a closure system associated with the gravity flow feed openings, and the upper portion of the trough cage.

FIG. 4 shows the exploded view of the slide doors 33 and the gravity flow modification plate 32. The slide doors 33 are individual pieces that slide in the recessed areas 34 located on the gravity flow modification plate 32. The slide doors 33 are opened by pushing them from the outside of the gravity flow modification plate 32 inward towards the centerline 24 of the rotary feed mechanism. When the slide doors 33 are located in the inward most position, the gravity flow feed openings 30 are unobstructed allowing feed to flow from the feed hopper 12 into the trough. When the slide doors 33 are located in the outer most position, the slide doors 33 will obstruct feed flowing from the feed hopper bottom 20 into the trough 11.

Figure 5:
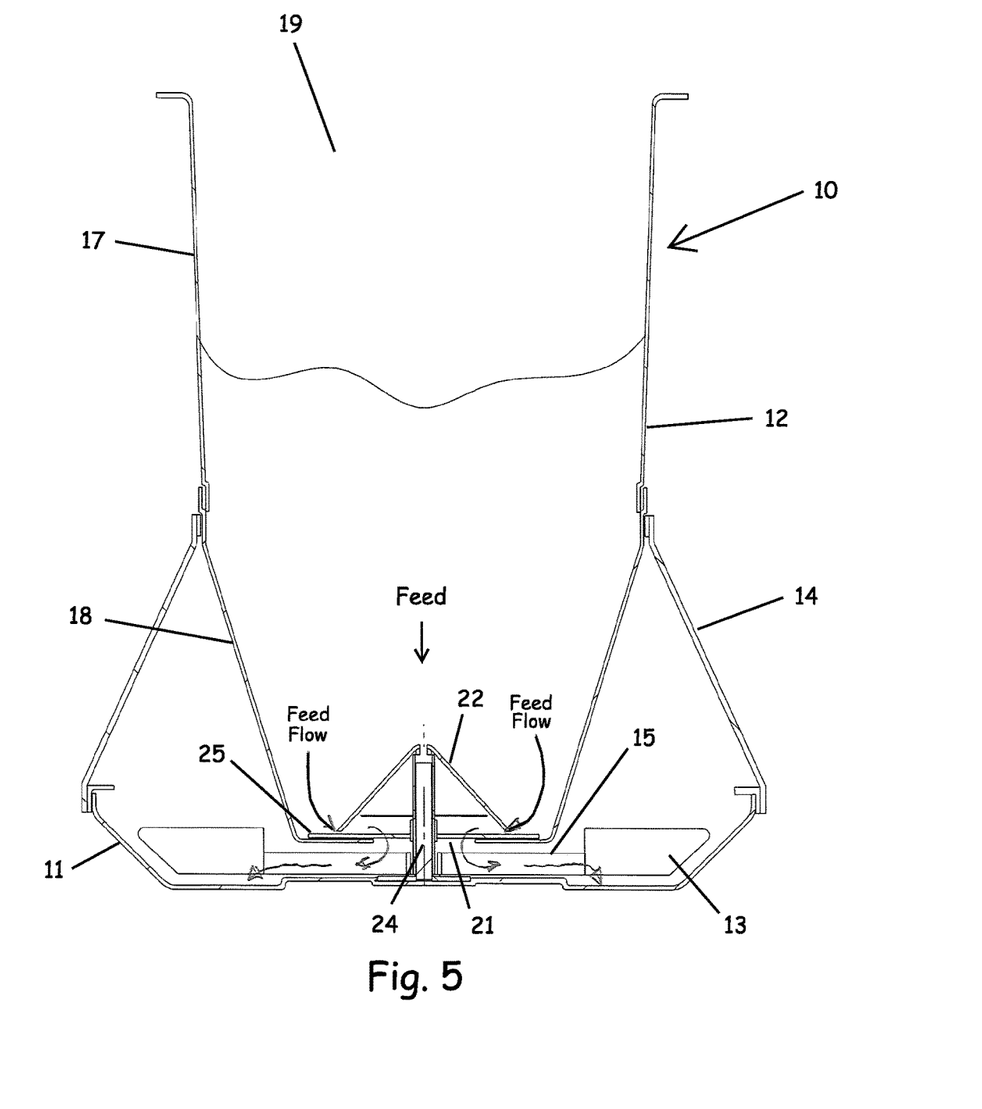
FIG. 5 is a cross section elevation view of the rotary livestock feeder showing the normal mechanical feed flow of the feeder.

FIG. 5 shows the normal mechanical feed flow of the rotary feeder 10. The feed is mechanically swept beneath the feed cone 22 by the sweep member 25 and falls through the central discharge hole 21 located on the feed hopper bottom 20. The feed is then swept to the outer perimeter of the trough 11 by the feed wheel 13. This process works very well for larger animals that are stronger and more capable of moving the feed wheel 13 causing the mechanical operation to occur. However, present conditions exist in the swine industry where much smaller animals are being placed on rotary feeders and are not yet big or strong enough to move the feed wheel 13.

The present invention solves this problem by creating a gravity flow feeder for the first several weeks of animal growth allowing the animals to gain enough size and strength to operate the rotary feeder properly. This is achieved by installing and attaching the gravity flow modification plate 32 and slide doors 33 under the feed hopper bottom 20 with the gravity flow feed openings 30 formed therein.

Figure 6:
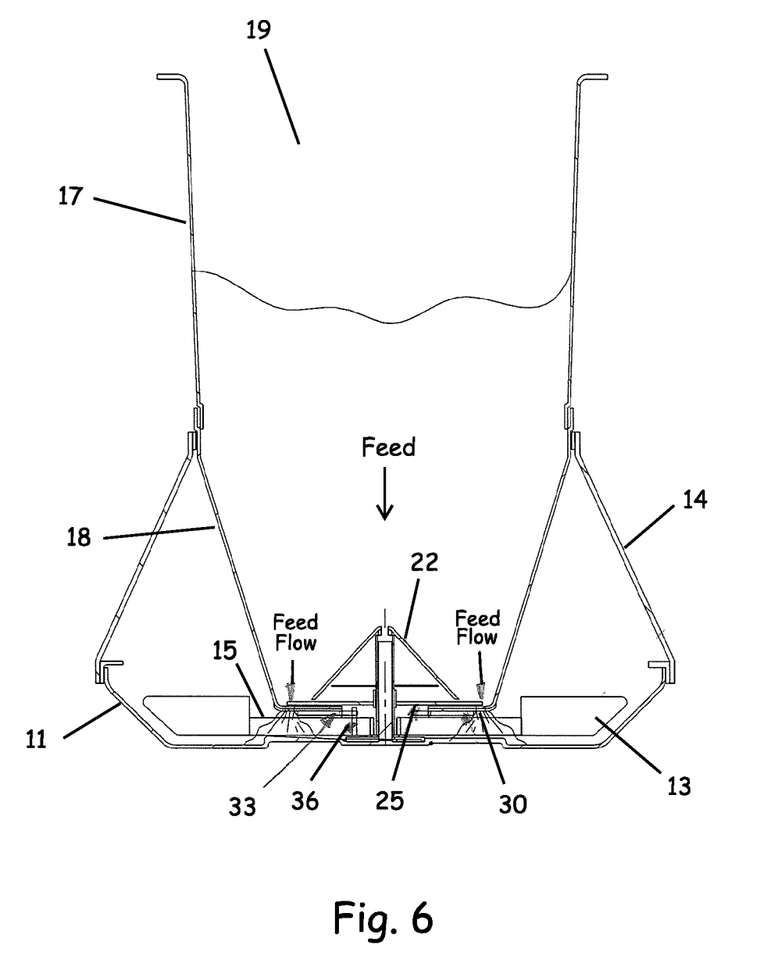
FIG. 6 is a cross section elevation view of the rotary livestock feeder showing the gravity feed flow when the gravity flow feed openings are open.

FIG. 6 shows the feed flow from the feed hopper bottom 20 into the trough 11 when the gravity flow feed openings 30 are unobstructed by the slide doors 33. The feed is able to flow freely from the feed hopper 12 into the trough 11 where the animals can consume the feed. The gravity flow feed openings 30 are sized such that a desired amount of feed exiting the openings occurs, but not so large to allow the animals to consume the feed flow directly from the openings 30. The feed flow from the gravity flow feed openings 30 is limited so that as the animals consume the feed, the feed is consumed faster than it is supplied. This limiting feed will cause the animal to naturally root and sort around the feed wheel 13. If the animals are big and strong enough to move the feed wheel 13 to access feed located around and beneath the feed wheel 13, then the rotary feed action is initiated.

The present invention also has an activator mechanism 35 associated with the feed wheel 13 that is arranged to cause the slide doors 33 to move from their open positions to their closed positions automatically upon rotation of the feed wheel 13. The activator mechanism 35 has an activator pin 36 attached to and extending upwardly from one of the spokes 15 of the feed wheel 13. The activator pin 36 has a path of movement when the feed wheel 13 rotates that causes the pin 36 to contact with the slide doors 33. As the feed wheel 13 is rotated, the activator pin 36 rotates and contacts the slide doors 33 forcing the doors 33 to be moved in the radially outward direction. Eventually and over time, the feed wheel 13 will make a complete revolution causing the activator pin 36 to contact all of the slide doors 33 one-by-one and forcing them to move to the maximum outward position. When the slide doors 33 are in the maximum outward position, the slide doors 33 obstruct feed flow from the gravity flow feed openings 30 in the hopper bottom 20, thereby automatically converting the gravity feeder into a mechanical rotary feeder.

Figure 7:
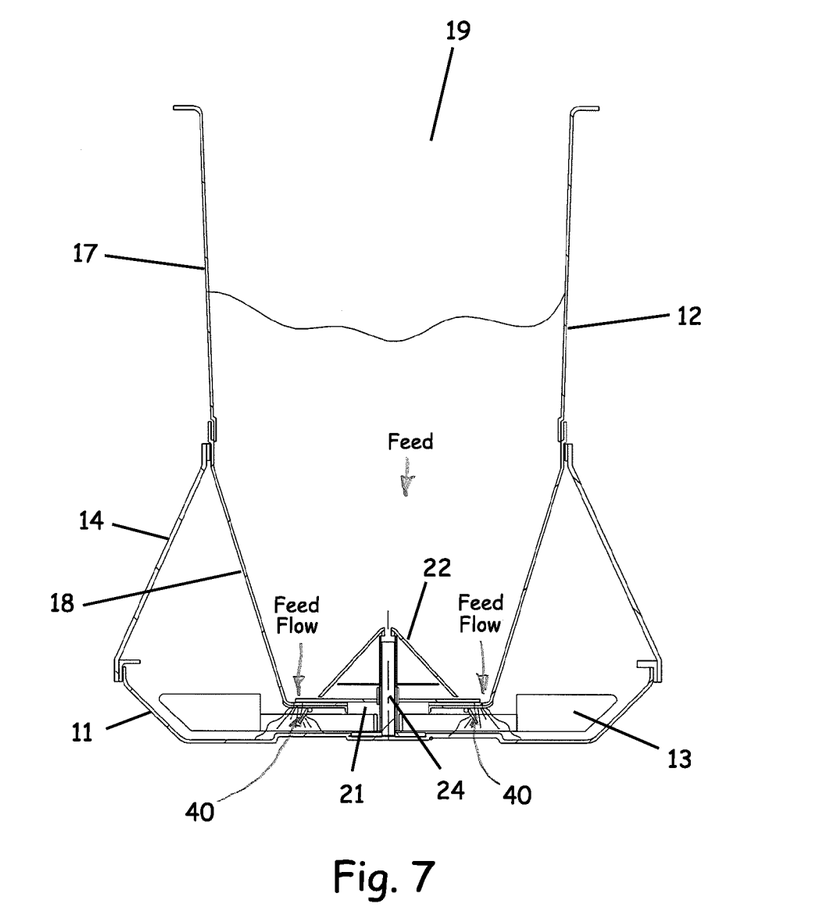
FIG. 7 is another cross section elevation view of the rotary livestock feeder showing an alternate embodiment in which flip doors are used instead of sliding doors to close the gravity flow feed openings.

FIG. 7 shows a similar construction where flip doors 40 are hinged to the underside of the feed hopper bottom 20 and activated by contact with the feed wheel 13 causing the flip doors 40 to close and obstruct feed flow through the gravity flow feed openings 30. There are a variety of other means of achieving obstruction of gravity feed flow in a rotary type feeder, such as a rotating plate, manually adjusted feed flow orifices, and interchangeable plates. In each of these alternative arrangements, a closure system can be provided with a first condition in which the gravity flow feed openings 30 are open to allow gravity feed flow through the openings 30 into the trough 11, and a second condition in which the gravity flow feed openings 30 are closed.

The present invention provides a rotary or mechanical flow feeder 10 that can be converted into a gravity type feeder for application where small animals need to be fed. The feeder 10 can then be converted from gravity flow back to mechanical flow by a closure system 31 that blocks the gravity flow openings 30. The closure system 31 allows the conversion to be automatic based on the natural feeding behavior of the animals.

While the invention has been specifically described in connection with specific embodiments thereof, it is to be understood that this is by way of illustration and not of limitation, and the scope of the appended claims should be construed as broadly as the prior art will permit.

What is claimed is:

1. A feeder for dispensing feed to livestock, comprising:
   a trough;
   a hopper mounted above said trough, said hopper including a sidewall, a bottom, a central feed discharge hole through said bottom, and at least one gravity flow feed opening through said bottom, said gravity flow feed opening being located between said central feed discharge hole and said sidewall;
   a deflector mounted in said hopper above said hopper bottom and vertically spaced from said hopper bottom, said deflector covering said central feed discharge hole to restrict gravity flow of feed from said hopper through said central feed discharge hole;
   a sweep member mounted for rotation about a vertical axis, said sweep member being located between said deflector and said hopper bottom for sweeping feed to said central feed discharge hole to discharge therethrough into said trough; and
   a closure system associated with said gravity flow feed opening, said closure system having a first condition in which said gravity flow feed opening is open to allow gravity feed flow through said opening into said trough, and a second condition in which said gravity flow feed opening is closed;
   wherein said closure system is a flip door hinged to an underside of the hopper bottom.

2. A feeder for dispensing feed to livestock, comprising:
   a trough;
   a hopper mounted above said trough, said hopper including a sidewall, a bottom, a central feed discharge hole through said bottom, and at least one gravity flow feed opening through said bottom, said gravity flow feed opening being located between said central feed discharge hole and said sidewall;
   a deflector mounted in said hopper above said hopper bottom and vertically spaced from said hopper bottom, said deflector covering said central feed discharge hole to restrict gravity flow of feed from said hopper through said central feed discharge hole;
   a sweep member mounted for rotation about a vertical axis, said sweep member being located between said deflector and said hopper bottom for sweeping feed to said central feed discharge hole to discharge therethrough into said trough; and a closure system associated with said gravity flow feed opening, said closure system having a first condition in which said gravity flow feed opening is open to allow gravity feed flow through said opening into said trough, and a second condition in which said gravity flow feed opening is closed;

wherein said at least one gravity flow feed opening comprises a plurality of openings in said hopper bottom that are spaced in a circular pattern surrounding an outer periphery of said deflector as viewed in plan view;

wherein said closure system comprises a plurality of slide doors, each slide door having a first position in which a respective gravity flow feed opening is open and a second position in which the respective gravity flow feed opening is closed by the slide door;

wherein said sweep member is operably coupled with a feed wheel disposed below said hopper in said trough so that animal-induced rotation of said feed wheel in said trough causes rotation of said sweep member in said hopper for sweeping feed to said central feed discharge hole for discharge into said trough;

further comprising an activator mechanism associated with said feed wheel that is arranged to cause said slide doors to move from said first positions to said second positions upon rotation of said feed wheel; and wherein said activator mechanism comprises an activator pin attached to the feed wheel, said activator pin being arranged to contact said slide doors and force the slide doors radially outwardly from said first positions to said second positions upon rotation of said feed wheel.

3. The feeder according to claim 2, wherein said feed wheel comprises a hub mounted to an axle for rotation about said vertical axis, and a plurality of spokes extending radially outwardly from said hub, and said activator pin extends upwardly from one of said spokes.

4. A feeder for dispensing feed to livestock, comprising:
a hopper having a sidewall, a bottom, a central feed discharge hole through said bottom, and a plurality of gravity flow feed openings through said bottom, said gravity flow feed openings being arranged around said central feed discharge hole;
a deflector mounted in said hopper above and vertically spaced from said hopper bottom, said deflector covering said central feed discharge hole to restrict gravity flow of feed from said hopper through said central feed discharge hole;
a sweep member mounted for rotation about a vertical axis, said sweep member being located between said deflector and said hopper bottom for sweeping feed to said central feed discharge hole to discharge therethrough; and
a closure system associated with said gravity flow feed openings, said closure system having a first condition in which said gravity flow feed openings are open to allow gravity feed flow through said openings, and a second condition in which said gravity flow feed openings are closed;
wherein said closure system comprises a flip door hinged to an underside of the hopper bottom.

5. A feeder for dispensing feed to livestock, comprising:
a hopper having a sidewall, a bottom, a central feed discharge hole through said bottom, and a plurality of gravity flow feed openings through said bottom, said gravity flow feed openings being arranged around said central feed discharge hole;
a deflector mounted in said hopper above and vertically spaced from said hopper bottom, said deflector covering said central feed discharge hole to restrict gravity flow of feed from said hopper through said central feed discharge hole;
a sweep member mounted for rotation about a vertical axis, said sweep member being located between said deflector and said hopper bottom for sweeping feed to said central feed discharge hole to discharge therethrough; and
a closure system associated with said gravity flow feed openings, said closure system having a first condition in which said gravity flow feed openings are open to allow gravity feed flow through said openings, and a second condition in which said gravity flow feed openings are closed;
wherein said gravity flow feed openings are spaced in a circular pattern surrounding an outer periphery of said deflector as viewed in plan view;
wherein said closure system comprises a plurality of slide doors, each slide door having a first position in which a respective gravity flow feed opening is open and a second position in which the respective gravity flow feed opening is closed by the slide door;
wherein said sweep member is operably coupled with a feed wheel disposed below said hopper in said trough so that animal-induced rotation of said feed wheel in said trough causes rotation of said sweep member in said hopper for sweeping feed to said central feed discharge hole for discharge into said trough;
further comprising an activator mechanism associated with said feed wheel that is arranged to cause said slide doors to move from said first positions to said second positions upon rotation of said feed wheel; and
wherein said activator mechanism comprises an activator pin attached to the feed wheel, said activator pin being arranged to contact said slide doors and force the slide doors radially outwardly from said first positions to said second positions upon rotation of said feed wheel.

6. The feeder according to claim 5, wherein said feed wheel comprises a hub mounted to an axle for rotation about said vertical axis, and a plurality of spokes extending radially outwardly from said hub, and said activator pin extends upwardly from one of said spokes.

* * * * *